United States Patent [19]
Watanabe

[11] Patent Number: 5,522,481
[45] Date of Patent: Jun. 4, 1996

[54] VIBRATION DAMPING DEVICE USING ER FLUIDS

[75] Inventor: Isao Watanabe, Iruma, Japan

[73] Assignee: Bridgestone/Firestone, Inc., Akron, Ohio

[21] Appl. No.: 353,580

[22] Filed: Dec. 9, 1994

[51] Int. Cl.[6] .................................................. F16F 9/53
[52] U.S. Cl. ........................................ 188/267; 267/140.14
[58] Field of Search ............................... 188/267, 299, 188/315; 267/140.12, 140.13; 60/326, 545; 137/909

[56] References Cited

U.S. PATENT DOCUMENTS

| | | | |
|---|---|---|---|
| 4,351,515 | 9/1982 | Yoshida | 188/267 |
| 4,819,772 | 4/1989 | Rubel . | |
| 4,858,733 | 8/1989 | Noguchi et al. . | |
| 4,896,752 | 1/1990 | Shtarkman . | |
| 5,000,299 | 3/1991 | Goto et al. . | |
| 5,014,829 | 5/1991 | Hare, Sr. . | |
| 5,076,403 | 12/1991 | Mitsui | 188/267 |
| 5,161,653 | 11/1992 | Hare, Sr. . | |
| 5,170,866 | 12/1992 | Ghaem . | |
| 5,180,145 | 1/1993 | Watanabe et al. . | |
| 5,259,487 | 11/1993 | Petek | 188/267 |
| 5,277,281 | 1/1994 | Carlson et al. | 267/140.14 |

FOREIGN PATENT DOCUMENTS

| | | | |
|---|---|---|---|
| 0552568 | 12/1992 | European Pat. Off. . | |
| 6066342 | 3/1994 | Japan | 188/267 |
| 2255150 | 10/1992 | United Kingdom | 188/267 |

*Primary Examiner*—Matthew C. Graham
*Attorney, Agent, or Firm*—Carmen S. Santa Maria

[57] ABSTRACT

A vibration damping device for mounting between two spaced portions of a vehicle for absorbing road forces exerted on the vehicle. An inner metal cylindrical housing forms an internal piston chamber and is connected at one end to one portion of the vehicle, with the outer end of the rod of a piston which is slidably mounted within the piston chamber, being connected to the other portion of the vehicle. An outer housing surrounds a portion of the inner housing and forms a fluid transfer duct between fluid chambers formed on opposite sides of the piston within the piston chamber. An electrode is mounted on an inner surface of the outer housing and is electrically isolated therefrom and communicates with the fluid transfer duct for applying a voltage across the duct to affect the viscosity of an electrorheological (ER) fluid flowing therethrough to increase the damping force of the device.

17 Claims, 3 Drawing Sheets

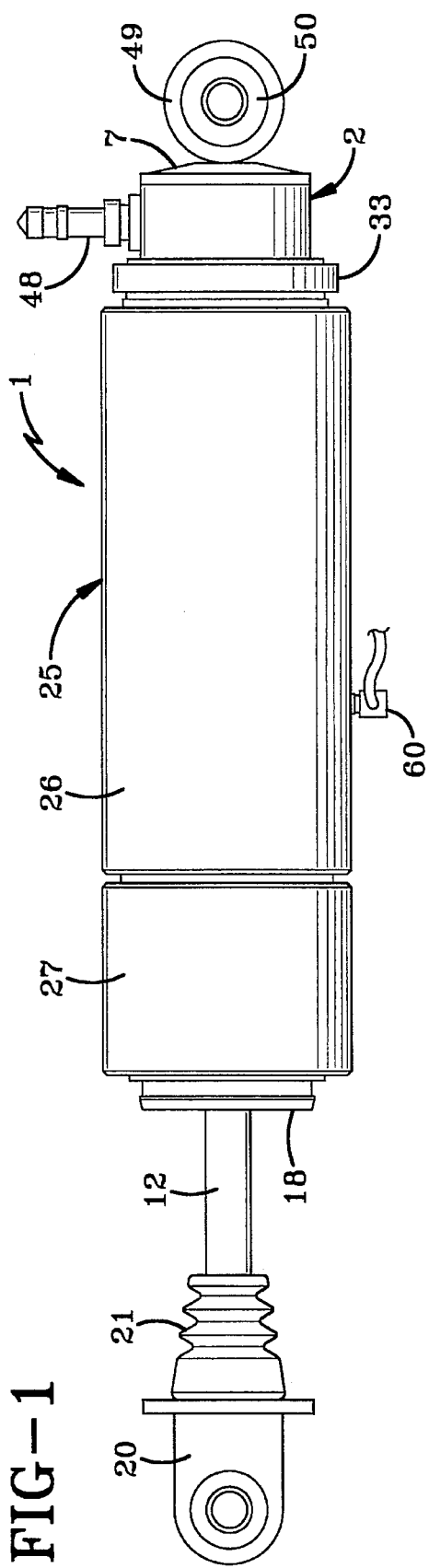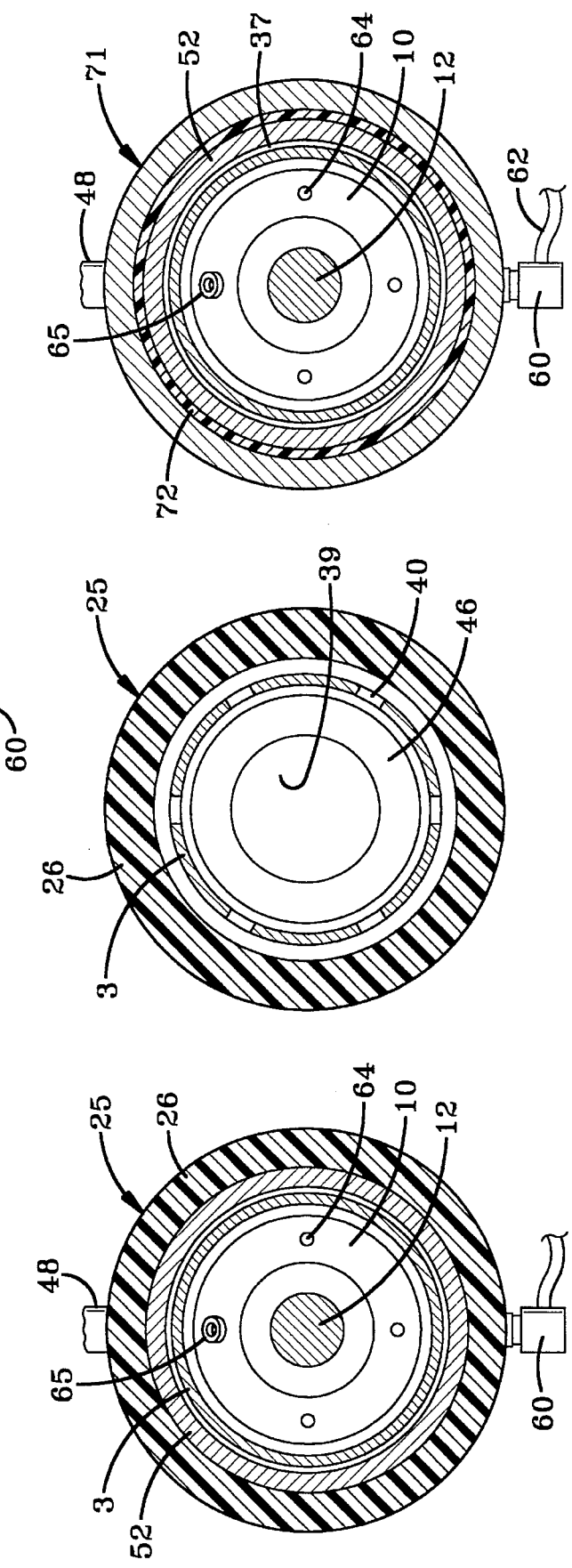

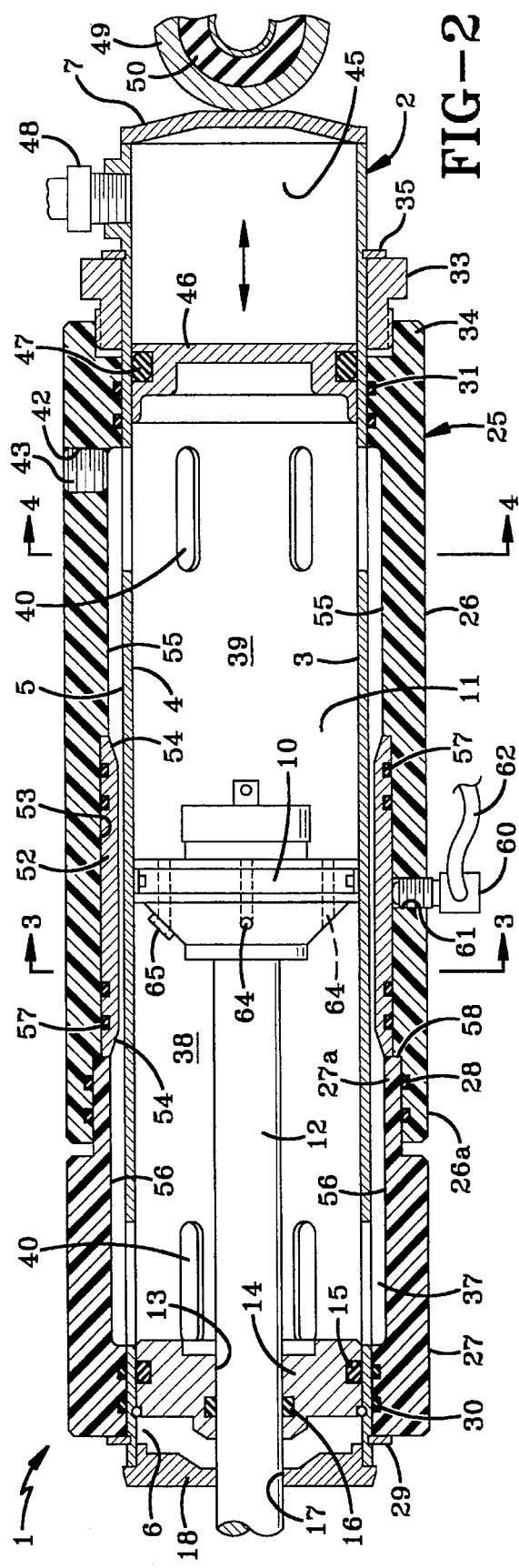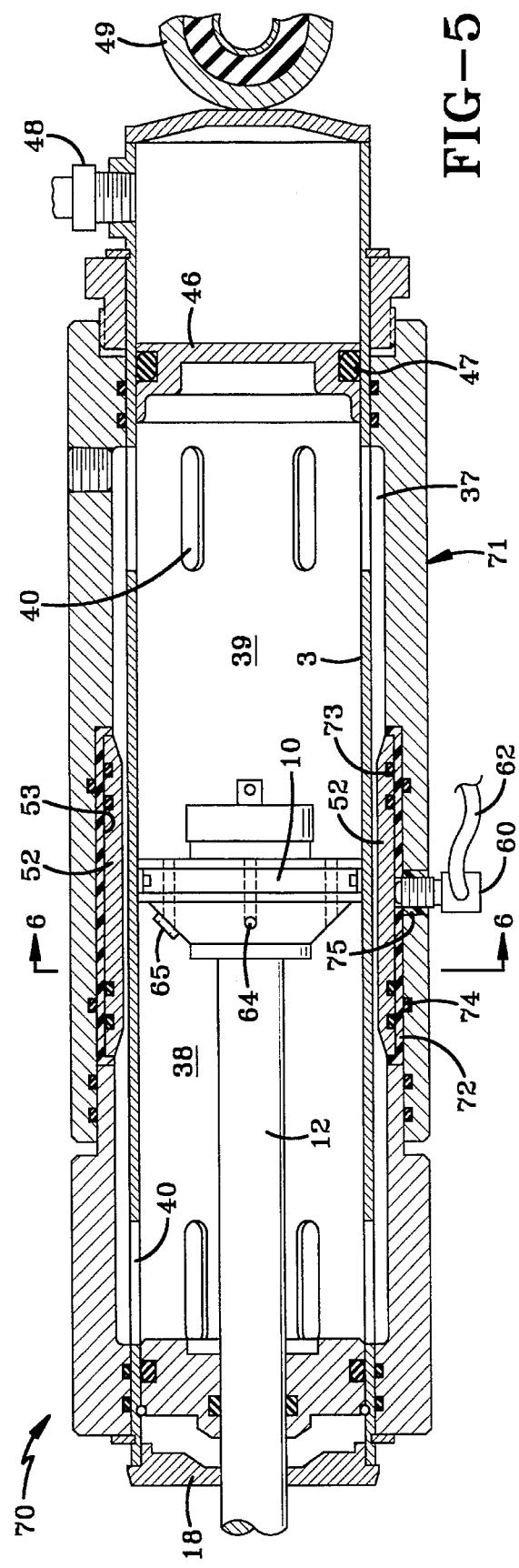

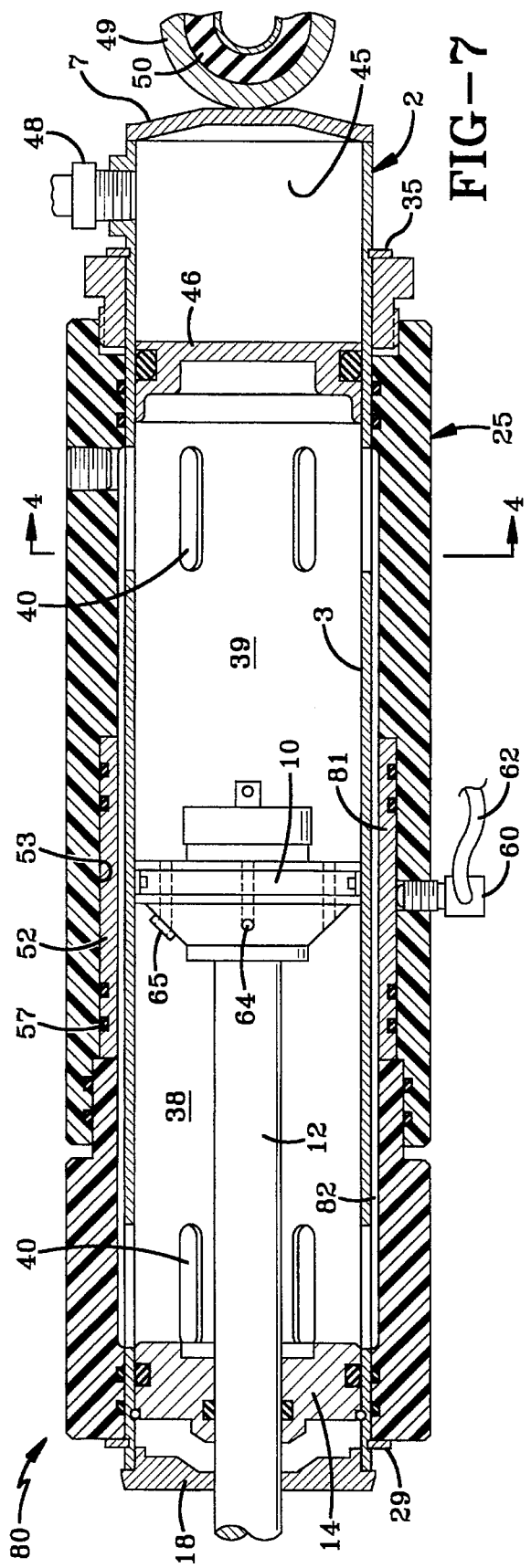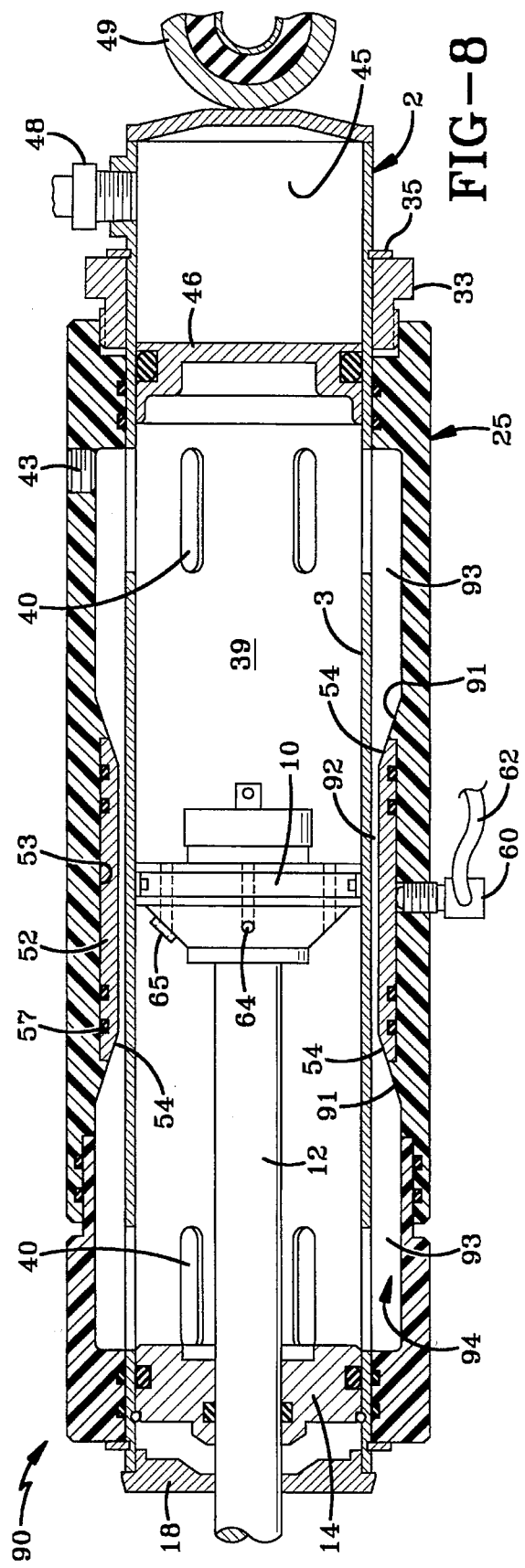

5,522,481

VIBRATION DAMPING DEVICE USING ER FLUIDS

BACKGROUND OF THE INVENTION

1. Technical Field

The invention relates to vibration damping devices which develop damping performance when being applied to a suspension member, such as for automobiles or other equipment. More particularly, the invention relates to such a damping device using an electrorheological (ER) fluid as the damping medium, which device is of a relatively simple structure, easy to assemble and to apply a voltage to the ER fluid contained therein for changing the damping characteristics of the device.

2. Background Information

Vibration damping devices have been used for considerable periods of time to dampen the vibrational forces applied to the suspension system of vehicles to provide a smoother ride by reducing the vibrations caused by road bumps and depressions passing from the tires to the vehicle frame by the interposing of oil-filled shock absorbers or high-pressure gas damping devices.

Although these prior art oil and high-pressure gas damping devices have proven satisfactory, a more recent development has evolved in which an electrorheological or electroviscous fluid is used within the chamber of the damping device, wherein the liquid is in contact with one or more electrodes, usually mounted in a restrictive passage, which depending upon the size of the electrodes and the amount of voltage applied to the liquid, will change the viscosity of the liquid, enabling the damping device to have a greater range of damping characteristics than those achieved by the high-pressure gas or oil-filled shock absorbers.

An example of an anti-vibration device which uses an expandable liquid chamber containing an electrorheological fluid is shown in U.S. Pat. No. 4,973,031. U.S. Pat. No. 4,858,733 discloses another damping device using electrodes in combination with an electroviscous liquid contained within closed chambers. The liquid is movable through a restricted passage where voltage is applied to the electroviscous liquid as it moves through the passage to change its viscosity to achieve various damping effects. Various other types of such ER vibration damping devices use elastomeric members or sleeves for containing the ER fluid, such as shown in U.S. Pat. No. 5,180,145. Although these devices have proved satisfactory, they are limited as to the amount of internal pressures available for damping, since the sleeves expand and affect the response time.

Therefore, the use of rigid fluid chambers formed of metal have been utilized with ER fluids in order to be able to develop higher internal pressure and quicker response times. U.S. Pat. Nos. 4,819,772 and 5,259,487 are believed to be the closest prior art to the vibration damping device of the present invention. The damping devices of both of these patents use an ER fluid which is contained within rigid housings to provide for increased pressures and quicker response time not believed obtainable with ER dampers using an elastomeric sleeve or bellows for the chamber-forming member.

However, the structures of both of these prior art damping devices require a complicated structure consisting of numerous parts in order to achieve the electrical isolation required for applying a voltage to the restricted orifices or ducts through which the ER fluid moves, and requires the passage of the wires applying the voltage to the electrode to pass through the ER fluid chamber. Likewise, the outer body or housing must be of a rigid metal, since this outer housing is connected at one end directly to one of the spaced vehicle components, and therefore must be of sufficient strength to support the various loads and forces applied thereto. An outer end of the piston rod is connected to the other of the spaced vehicle components for mounting the vibration damping device on the vehicle.

Thus, the need exists for an improved vibration damping device using ER fluids which is of a simpler construction, which is able to withstand the various loads and forces exerted thereon when mounted between spaced structural components of a vehicle, and which enables a voltage to be applied to the electrode contained within the damping device in an easier manner than existing ER fluid dampers.

SUMMARY OF THE INVENTION

Objectives of the invention include providing an improved damping device using ER fluids, preferably of the type adapted to be incorporated within a vehicle suspension system, which solves the aforementioned problems of prior art dampers by reducing the complexity of the damper without sacrificing the damping characteristics achieved thereby.

A still further objective of the invention is to provide such a damping device which, when used with an electrorheological or electroviscous fluid, enables the orifice and associated electrode to have various configurations in order to achieve various damping characteristics.

Another objective of the invention is to provide such a damping device which is of a considerably simpler structure than prior dampers using ER fluids, and which is able to withstand the various loads and forces exerted thereon when mounted between spaced components in a vehicle suspension system.

A further objective of the invention is to provide such a damping device in which the electrode for supplying voltage to the ER fluid is mounted outwardly of the ER fluid to eliminate the passing of the electrical wires, which supplies the voltage to the electrode, through the ER fluid, as in prior dampers using ER fluids.

A still further objective of the invention is to provide such a damping device which incorporates a pressurized gas reservoir within the damper to prevent cavitation and the formation of bubbles within the ER fluid, thereby preventing the creation of electrical arcing within the fluid.

Still another objective of the invention is to provide such a damper in which the outer housing can be formed of a dielectric material, with the inner housing which forms the piston chamber being formed of metal, thereby enabling smaller diameter cylinders to be used, and to enable all metal components of the damper except for the electrode, to be grounded, to reduce the risk of electrical shorts or shocks.

A further objective of the invention is to provide such a damper in which the piston may contain various valving to enable a portion of the ER fluid to pass through the piston when moving in either the compression or retraction stroke.

Still another objective of the invention is to provide such a damping device which can be easily assembled and disassembled for repair and ease of manufacture without sacrificing the integrity of the device.

A further objective of the invention is to provide such an improved damping device which is of a rugged, compact, relatively lightweight, simple design, which achieves the stated objectives in a simple and efficient manner.

These objectives and advantages are obtained by the vibration damping device of the present invention, the general nature of which may be stated as including a metallic cylindrical inner housing forming a piston chamber; a piston axially movable within the piston chamber and dividing said chamber into two separate fluid chambers; an outer housing surrounding at least a portion of the metallic inner housing; annular fluid transfer duct means formed between said inner and outer housings and surrounding said piston chamber providing fluid communication between said fluid chambers on opposite sides of said piston, said fluid chambers adapted to be filled with an electrorheological (ER) fluid; electrode means mounted on the outer housing for applying an electric field across at least a portion of the duct means to increase the flow resistance of the ER fluid passing therethrough; a piston rod connected at one end to the piston and extending beyond a first end of the inner housing with another end of said piston being adapted to be connected to a first support structure; and connection means mounted on a second end of the inner housing for connecting said second end of the inner housing to a second structure spaced from the first structure, whereby load on said damping device is supported by said inner housing and piston rod.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 1 is a side elevational view of the vibration damping device of the present invention;

FIG. 2 is an enlarged fragmentary longitudinal sectional view of the damping device of FIG. 1;

FIG. 3 is a sectional view taken on line 3—3, FIG. 2;

FIG. 4 is a sectional view taken on line 4—4, FIG. 2;

FIG. 5 is a fragmentary longitudinal sectional view similar to FIG. 2 of a second embodiment of the vibration damping device of the present invention;

FIG. 6 is a sectional view taken on line 6—6, FIG. 5; and

FIGS. 7 and 8 are longitudinal sectional views similar to FIGS. 2 and 5 showing further embodiments of the vibration damping device.

DESCRIPTION OF THE PREFERRED EMBODIMENTS

A first embodiment of the improved vibration damping device is indicated generally at 1, and is shown in FIGS. 1–4. Device 1 includes an inner housing 2 formed of a rigid metal having a cylindrical body 3 with inner and outer cylindrical surfaces 4 and 5, respectively. One end of cylindrical body 3 is open at 6, with the other end being closed by a wall 7.

A piston 10 is slidably mounted within a piston chamber 11 formed within cylindrical body 3, and has a piston rod 12 attached thereto. Rod 12 extends through a complementary-shaped opening 13 formed in an end closure ring 14. Ring 14 is mounted within open end 6 of cylindrical body 3, and is sealingly engaged therewith by an outer O-ring 15 and an inner O-ring 16. Piston rod 12 also extends through a complementary-shaped opening 17 formed in an end cap 18. As shown in FIG. 1, a connector 20 is mounted on the outer end of piston rod 12 for securing the piston rod to a vehicle component. A usual jounce bumper 21 will be mounted on piston rod 12 adjacent connector 20 for absorbing severe forces exerted on vibration damper 1 to prevent damage thereto upon the vehicle experiencing severe depressions or bumps in a road surface.

Damper 1 further includes an outer housing, indicated generally at 25, which in the embodiment of FIGS. 1–4 is formed of a dielectric material, such as various types of high-strength plastic materials. Housing 25 preferably is formed of two cylindrical portions 26 and 27 which are axially telescopically slidably joined at their inner ends 26a and 27a, and fluidly sealed by a pair of O-rings 28.

The outer end of cylindrical portion 27 is secured in position on inner housing 2 by a clip ring 29, and is sealingly engaged with the outer surface of housing 2 by a spaced pair of O-rings 30. The outer end of cylindrical portion 26 is also sealingly engaged with the outer surface of inner housing 2 by a spaced pair of O-rings 31. Cylindrical portions 26 and 27 of outer housing 25 are slidably mounted and assembled on inner housing 2, and secured in an adjusted position by an adjustment screw ring 33 which is threadably engaged with an internally threaded portion 34 at the outer end of cylindrical housing portion 26. Screw ring 33 is retained in position by a clip ring 35.

As shown in FIG. 2, the outer diameter of inner cylindrical housing 2 is less than the inner diameter of outer housing 25, and in particular, less than the inner diameters of cylindrical portions 26 and 27, in order to provide an annular fluid transfer duct 37 therebetween, which duct extends generally throughout the axial length of outer housing 25. Piston 10 divides chamber 11 into a pair of fluid chambers 38 and 39, which communicate with transfer duct 37 by a plurality of elongated slots 40 formed in cylindrical body 3 of housing 2. Thus, as shown in FIG. 2, as piston 10 moves within chamber 11, an electrorheological (ER) fluid which is contained within chamber 11 will flow through openings 40 and along transfer duct 37 between the two fluid chambers, depending upon the direction of movement of the piston. A hole 42 is formed in outer housing 25 and communicates with fluid transfer duct 37 in order to fill piston chamber 11 and transfer duct 37 with an ER fluid. A threaded plug 43 will seal hole 42 after filling of damper 1 with an ER fluid.

A pressure chamber 45 is formed in one end of inner housing 2 and is separated from piston chamber 11 by an axially slidably mounted piston or partition wall 46 which is fluidly sealed from chamber 11 by an O-ring 47. Chamber 45 will be filled with a pressurized compressible gas. Upon movement of piston 10 within chamber 11, wall 46 will move into and away from chamber 45 to compensate for the change of volume within chamber 11 caused by the movement of piston rod 12 into and out of the chamber. This movement of wall 46 will maintain a generally constant pressure within the ER fluid to prevent the formation of air bubbles or cavitation, which could cause electrical arcing and shorting when a voltage is applied to the ER fluid, as described below. A valve 48 communicates with pressure chamber 45 for supplying the pressurized gas into the chamber.

In accordance with one of the features of the invention, a connector 49 is rigidly secured by welds to end closure wall 7 of inner housing 2 for mounting the vibration damper on another portion of a vehicle spaced from that portion of the vehicle to which piston rod connector 20 is attached. An elastomeric bushing 50 preferably is mounted within connector 49 to assist in absorbing small vibrations imparted on the vehicle and damper to assist in achieving the desired damping characteristics.

In accordance with another feature of the invention, an electrode 52 is mounted within an annular recess 53 formed within cylindrical portion 26 of outer housing 25. Electrode 52 preferably is an annular metal band which has conical ends 54 to provide a smooth taper when merging into inner surfaces 55 and 56 of cylindrical portions 26 and 27, respectively, of outer housing 25. Electrode 52 is sealingly mounted within recess 53 by a plurality of O-rings 57. Electrode 52 is seated within recess 53 and clamped therein by an inner edge 58 of outer housing cylindrical portion 27 upon the advancement of cylindrical portion 26 toward portion 27 by advancement of adjustment screw ring 33 (FIG.. 2). A voltage is supplied to electrode 52 by an electrical connector 60, which extends through a complementary-shaped opening 61 formed in outer housing 25, and which is connected to a voltage source by a wire 62.

A plurality of bleed holes 64 preferably are formed in piston 10 to permit a limited amount of ER fluid to pass between chambers 38 and 39 as the piston moves in chamber 11. If desired, a one-way check valve 65 may also be used in piston 10 to permit the flow of fluid in only one direction during movement of the piston.

The operation of vibration damper 1 is best illustrated in FIG. 2. Upon the vehicle experiencing a depression or protrusion in the roadway, the piston will move within chamber 11, forcing the ER fluid from one chamber into the other chamber via fluid transfer duct 37. Upon passing through the restricted area of duct 37 adjacent electrode 52 which has a voltage applied thereto, the viscosity of the ER fluid will be changed, depending upon the amount of voltage applied and the width of the restricted passage to affect the damping characteristics of the damper, as is well known in the ER fluid damping art.

One of the main features of the present invention is that the inner housing, which is formed of rigid metal, and piston rod 12, are mounted on the vehicle at spaced locations and support the weight and absorb the various forces exerted on the damper. This enables outer housing 25 to be foiled of a dielectric lightweight, preferably plastic material, since it need not absorb any of the forces and loads as do the outer housings or cylinders of prior art ER vibration dampers. Inner metal housing 2 will be connected to ground, with only electrode 52 being electrified, which electrode is completely contained within a dielectric housing. The only external electrical connection is electrical connector 60 and wire 62. Thus, all electrified components are substantially out of possible contact with individuals and/or surrounding components of the vehicle. Likewise, as described above and shown in FIG. 2, very few components are required to form damper 1, which is easily assembled by the slip-fit joinder of the outer housing cylindrical portions over the inner metal housing and their clamping engagement with electrode 52 through the adjustment of screw ring 33.

A second embodiment of the vibration damping device of the present invention is indicated generally at 70, and is shown in FIGS. 5 and 6. Damper 70 is similar in most respects to damper 1 discussed above, except that outer housing 71 is formed of metal in contrast to the dielectric material of outer housing 25 of damper 1. In order to permit outer housing 71 to be formed of metal, an annular insulating sleeve 72 is seated within recess 53 and sealed by a plurality of O-rings 73 and 74 to prevent ER fluid which flows through transfer duct 37 from leaking beyond housing 71. Electrical connector 60 also will be insulated by a dielectric insulating sleeve 75 from metal housing 71. The remaining components and manner of operation of damper 70 will be the same as those discussed previously with respect to damper 1.

A third embodiment of the present invention is indicated generally at 80, and is shown in FIG. 7. Damper 80 is similar to damper 1 described above with the exception that electrode band 81 has a cylindrical configuration extending completely throughout its length and is seated entirely within recess 53. Electrode 81 does not have the conical ends similar to ends 54 of electrode 52 of damper 1, but provides a continuous uniform width to transfer duct 82 completely throughout the longitudinal length thereof, without any restricted duct area as provided by electrodes 52 of dampers 1 and 70.

A fourth embodiment of the improved damper is indicated generally at 90, and is shown in FIG. 8. Damper 90 is similar in most respects to dampers 1 and 80 in that it has a dielectric outer housing and a metallic inner housing. The main difference is that spaced conical areas 91 are formed on inner surface 55 of the outer housing adjacent electrode 52, and provides a continuous conical surface when merging with conical ends 54 of electrode 52. This provides a transfer duct 94 with a restricted flow area 92 adjacent electrode 52, but with the remaining portions 93 having a greater width which may be desirable for certain damping applications. Again, the remaining components of damper 90 are the same as those of dampers 1 and 80 which uses the dielectric outer housing.

In summary, the various embodiments provide for a vibration damping device intended for use with an ER fluid, which device is of a relatively simple construction, easy to assemble and mount on a vehicle, and in which the fluid transfer duct can have various configurations. Another advantage of the present invention is that the electrical connection to the electrode need not pass through the ER fluid as in prior ER dampers, and requires that only the electrode band be connected to a source of voltage. This provides a damper less susceptible to malfunction due to arcing or short circuiting of the applied voltage since the inner housing which is formed of metal, is connected to ground, and the outer housing can be formed of a dielectric insulating material, requiring only passage of the electrical connector through the outer housing to connect the internally located and electrically isolated electrode band to an exterior voltage supply.

Accordingly, the vibration damping device of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vibration damping device is constructed and used, the characteristics of the construction, and the advantageous, new and useful results obtained; the new and useful structures, devices, elements, arrangements, parts and combinations, are set forth in the appended claims.

I claim:

1. A vibration damping device including:

a metallic cylindrical inner housing forming a piston chamber;

a piston axially movable within the inner housing and piston chamber and dividing said chamber into two separate fluid chambers;

an outer housing spaced from and surrounding at least a portion of the metallic inner housing;

annular fluid transfer duct means formed between said spaced inner and outer housings and surrounding said piston chamber providing fluid communication between said fluid chambers on opposite sides of said piston, said fluid chambers adapted to be filled with an electrorheological (ER) fluid;

electrode means mounted on the outer housing and spaced from the inner housing for applying an electric field across at least a portion of the duct means to increase the flow resistance of the ER fluid passing therethrough;

a piston rod connected at one end to the piston and extending beyond a first end of the inner housing with another end of said piston being adapted to be connected to a first support structure; and connection means mounted on a second end of the inner housing for connecting said second end of the inner housing to a second structure spaced from the first structure, whereby load on said damping device is supported by said inner housing and piston rod.

2. The vibration damping device defined in claim 1 in which the electrode means is an annular band of metal mounted on an inner cylindrical surface of the outer housing adjacent the fluid duct means; and in which electrical connection means extends through the outer housing and is electrically connected to said annular band for applying an electrical voltage on said electrode means.

3. The vibration damping device defined in claim 2 in which the outer housing is formed of a dielectric material.

4. The vibration damping device defined in claim 2 in which the outer housing is formed of metal; and in which a dielectric material is mounted between the metal band of the electrode means and said outer housing to electrically isolate said band from the outer housing.

5. The vibration damping device defined in claim 2 in which the outer housing includes first and second cylindrical portions; in which an annular recess is formed in at least one of said portions with the annular metal band being seated therein; and in which the damping device further includes assembly means for joining said first and second portions axially together and for securing said annular metal band in said recess.

6. The vibration damping device defined in claim 5 in which the first and second portions of the outer housing are axially slidably joined; and in which the assembly means includes a pair of end retention members and an intervening adjustment screw ring.

7. The vibration damping device defined in claim 2 in which an annular recess is formed in the inner cylindrical surface of the outer housing; and in which the annular metal band is seated in said annular recess and has an annular surface in communication with the fluid transfer duct means.

8. The vibration damping device defined in claim 7 in which the annular surface of the metal band coincides with the inner cylindrical surface of the outer housing to provide a constant spacing between said inner cylindrical surface of the outer housing and an outer cylindrical surface of the inner housing generally throughout the length of the fluid transfer duct means.

9. The vibration damping device defined in claim 7 in which the annular surface of the metal band extends beyond the inner cylindrical surface of the outer housing and provides a reduced flow area in the fluid duct means.

10. The vibration damping device defined in claim 9 in which the annular surface of the metal band has conical ends which merge into the inner cylindrical surface of the outer housing.

11. The vibration damping device defined in claim 7 in which the inner cylindrical surface of the outer housing has annular conical areas which surround the annular recess; and in which said conical areas provide a smooth tapered joinder with the annular surface of the metal band.

12. The vibration damping device defined in claim 1 in which the annular fluid duct means has a substantially constant width throughout its longitudinal length.

13. The vibration damping device defined in claim 1 in which valve means are provided in the piston to permit passage of a portion of the ER fluid therethrough during movement of said piston.

14. The vibration damping device defined in claim 13 in which the valve means includes at least one through hole formed in said piston.

15. The vibration damping device defined in claim 13 in which the valve means includes at least one one-way check valve.

16. The vibration damping device defined in claim 1 in which a pressurized gas reservoir is formed within the inner housing adjacent the second end of said housing.

17. The vibration damping device defined in claim 16 including a movable partition means mounted within the inner housing for separating the gas reservoir from the fluid chambers.

* * * * *